United States Patent [19]

Lechner

[11] Patent Number: 4,634,907
[45] Date of Patent: Jan. 6, 1987

[54] SINGLE PHASE STEPPING MOTOR WITH IMPROVED POLE ARRANGEMENT

[75] Inventor: Hubert Lechner, Zug, Switzerland

[73] Assignee: LGZ Landis & Gyr Zug AG, Zug, Switzerland

[21] Appl. No.: 803,543

[22] Filed: Dec. 2, 1985

[30] Foreign Application Priority Data

Dec. 6, 1984 [CH] Switzerland .................. 5809/84

[51] Int. Cl.⁴ .................................. H02K 37/00
[52] U.S. Cl. .................... 310/49 R; 310/164
[58] Field of Search .............. 310/49, 162–165, 310/112

[56] References Cited

U.S. PATENT DOCUMENTS

| 2,951,957 | 9/1960 | Eigeman | 310/164 |
| 3,307,056 | 2/1967 | Woolley | 310/164 X |
| 3,555,323 | 1/1971 | Gerber | 310/162 |
| 3,737,695 | 6/1973 | Kilmer | 310/164 X |
| 3,800,175 | 3/1974 | Plötscher et al. | 310/164 |
| 3,857,053 | 12/1974 | Yatsushiro et al. | 310/164 X |
| 4,274,024 | 6/1981 | Gottschalk | 310/164 X |

FOREIGN PATENT DOCUMENTS

| 5809/84 | 12/1984 | PCT Int'l Appl. |
| 541893 | 10/1973 | Switzerland . |
| 2052882 | 1/1981 | United Kingdom . |

Primary Examiner—Donovan F. Duggan
Attorney, Agent, or Firm—Marmorek, Guttman & Rubenstein

[57] ABSTRACT

A stepping motor is disclosed, which includes an inventive arrangement of stator pole arms. The arrangement of stator pole arms has the effect of smoothing out the drive torque characteristic of the stepping motor.

4 Claims, 10 Drawing Figures

SINGLE PHASE STEPPING MOTOR WITH IMPROVED POLE ARRANGEMENT

BACKGROUND OF THE INVENTION

The invention concerns a single-phase stepping motor. Such stepping motors are known in the prior art, for instance as described in Patent CH-PS No. 541,893. Stepping motors of this type typically include a permanently magnetized rotor having at least one north pole and one south pole and a stator having at least two main poles and two auxiliary poles. The main poles comprise a north and south pole connected by a magnetic yoke around which is wound a coil. A current through the coil magnetizes the two main poles in opposite directions, depending on the direction of the current. The auxiliary poles are not energized, but get their magnetism by induction from the main poles. The pole pieces of the auxiliary poles are placed opposite the main poles and are displaced by a geometric and an electrical phase angle, generally designated $\alpha$. The sense and magnitude of this offset angle determines the sense of the rotation of the stepping motor when it is energized. It is characteristic of stepping motors that the drive torque, generated by an energizing electrical pulse, has a comparatively narrow maximum which leads to lack of smoothness in rotation.

SUMMARY OF THE INVENTION

The present invention provides for a unique arrangement of main and auxiliary pole pieces which, while retaining the original advantages of the stepping motor, has the effect of stretching out and smoothing the drive torque characteristic. In addition, it has the further effect of decreasing the required energizing current.

BRIEF DESCRIPTION OF THE DRAWINGS

Identical reference numbers in the different Figures designate the same parts.

DETAILED DESCRIPTION OF A PREFERRED EMBODIMENT

Figures 1A, 1B, 1C, 1D, 1E:
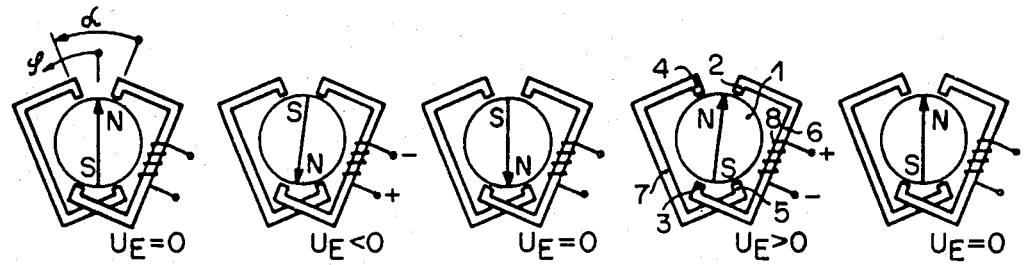
FIGS. 1A to 1F show a basic representation of a bipolar single-phase stepping motor at typical stages, and the corresponding impulse diagram of the energizing voltage.

The principle of functioning of a two-pole, single-phase stepping motor, as described in Patent CH-PS No. 541,893, is here described with reference to FIGS. 1A to 1F.

In FIGS. 1A to 1E, 1 is a permanently magnetized two-pole rotor, 2 and 3 are two main poles of the stator and 4 and 5 are two auxiliary poles of the stator. A magnetic yoke 6 joins the two main poles 2 and 3, and a magnetic yoke 7 joins the two auxiliary poles 4 and 5. The magnetic yoke 6 carries an energizer spool 8. An energizing current flowing in the energizer spool 8 magnetizes the two main poles 2 and 3 in opposite directions, while auxiliary poles 4 and 5 are not energized. Auxiliary poles 4 and 5 are placed opposite the main poles 2 and 3, electrically as well as spatially displaced at an angle $\alpha=45°$. The sense of direction of this offset determines the sense of direction of rotational angle $\phi$ of the stepping motor. It is here assumed that the stepping motor rotates in a positive, counterclockwise direction.

The energizer spool 8 is excited by means of bi-polar DC impulses, in which the positive and the negative amplitudes are illustratively assumed to be equal. One complete cycle of the energizing current $U_E$, as a function of time, is represented in FIG. 1F. Rotor 1 assumes, during one such complete cycle, all of the positions represented in FIGS. 1A to 1E, corresponding to the electrical pulses shown in FIG. 1F.

Figure 1F:
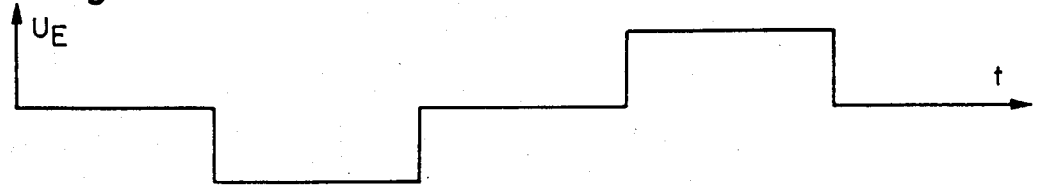

During the first quarter cycle, $U_E$ is equal to zero, and the position of the magnetized rotor 1 is such that its south-north axis S-N points vertically upward as shown in FIG. 1A. The first impulse, which could be negative, for example (see FIG. 1F), causes rotor 1 to rotate in a positive direction by almost 180°. As shown in FIG. 1B, the south-north axis S-N of the rotor magnet now assumes a position which is diagonal from upper right to lower left. Upon completion of the first impulse, $U_E$ becomes zero once more. (See FIG. 1F.) Rotor 1 continues to rotate in a positive direction, by a small angle, so that the south-north axis S-N again assumes a vertical position, this time pointing down as shown in FIG. 1C. At the occurrence of the next impulse (see FIG. 1F), which is positive, the rotor 1 rotates again by almost 180° in a positive direction, so that the south-north axis S-N points diagonally from the lower left to the upper right as shown in FIG. 1D. Again, $U_E$ returns to zero upon completion of th second impulse. (See FIG. 1F.) The rotor continues to rotate in a positive direction, so that the rotor again assumes a position which points vertically up, (FIG. 1E). Rotor 1 has thereby completed one full revolution and a new rotational period of the stepping motor can begin.

Figure 2:
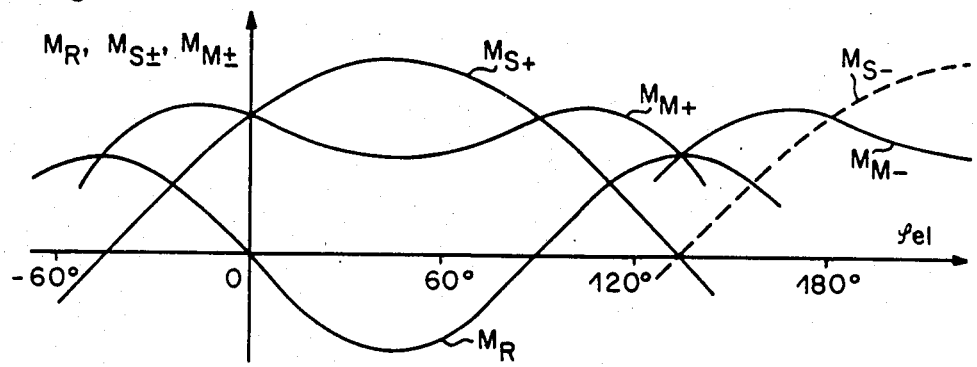
FIG. 2 is a plot of the various torques of the single-phase stepping motor of the invention, as a function of angle of rotation.

The characteristic of the motor moment or torque as a function of rotational angle $\phi$ is shown in FIG. 2 of the aforementioned reference. The torque or moment exhibits a single distinct maximum, of relatively large amplitude, while a second maximum has a smaller amplitude which is practically of the same size as the minimum.

In the stepping motor of the invention, the characteristic torques or moments are represented herein in FIG. 2. In the stepping motor of the present invention, the special arrangement and dimensions of the pole arms of the stator increase the amplitude of the second maximum, and also the height of the minimum, to a significant degree. Thus, the characteristics of the motor moment $M_{M+}$ and $M_{M-}$, shown in FIG. 2, are created, each possessing two almost identical maxima, separated from each other by a minimum, which itself has a relatively large amplitude. Thus, the torques or moments of the motor of the present invention have smaller variations during each cycle of rotation of the rotor.

In FIG. 2, the moments or torques acting upon rotor 1 are represented as a function of the rotational angle $\phi_{el}$.

When no current flows, the position of the rotor is determined by the rest moment $M_R$, which could, for instance, follow a sine function intersecting the zero axis at 0°, 90°, 180°, 270° and 360°. Positive excitation results in a motor moment $M_{M+}$, comprising of the rest moment $M_R$ plus the switching moment $M_{S+}$ created by the excitation of the stator poles. When the excitation is negative, a motor moment $M_{M-}$ is generated, which comprises the rest moment $M_R$ plus the switching moment $M_{S-}$, created by the excitation of the stator poles, where the switching moment $M_{S-}$ has the same sense as the switching moment $M_{S+}$, but lags behind $M_{S+}$ by 180°. The maximum of the characteristic of switching moment $M_{S+}$ or switching moment $M_{S-}$ preferably occurs at the value of rotational angle $\phi$, where the rest moment $M_R$ has nearly a minimum. In either case the following formulae apply:

$$M_+ = M_R + M_{S+}$$

and $$M_- = M_R + M_{S-}.$$

The amplitude of the energizing current is preferrably selected in such a manner as to render the amplitudes of the switching moments $M_{S+}$ and $M_{S-}$ to be double the amplitude of rest moment $M_R$. The applicable formula in that case is:

$$M_{S+,max} = M_{S-,max} = 2 \cdot M_{R,max}.$$

Figure 3:
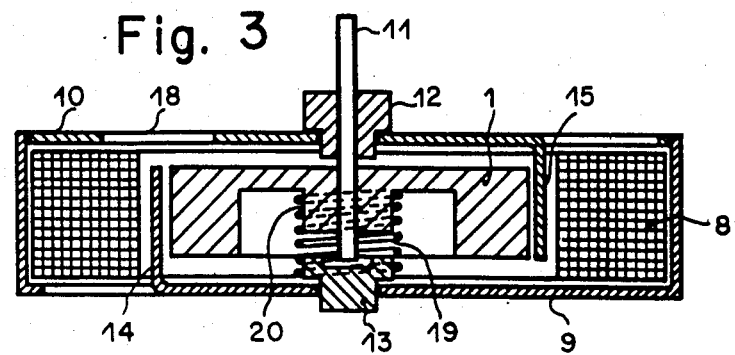
FIG. 3 shows a cross-section of the single-phase stepping motor of the invention.

In FIG. 3 a practical example of the inventive stepping motor is illustrated. The permanently magnetized rotor is designated by 1. It has 2p poles with alternating polarity (where p is an integer). It could be formed, for example, from a body of material which is magnetized on its outer surface, or by a magnetic body with pole cages. A stator housing 9 and a stator cover 10 surround the ring-shaped exciter spool 8. A shaft 11 of rotor 1 is supported in a bearing 12 of the stator cover 10, in a one-sided radial fashion. Bearing 12 and a second bearing 13, set into the stator housing 9, act as axial stops. Thanks to the radial support, on only one side, of the rotor 1, only minimal stresses are imposed upon the tolerances of the individual components. Stator housing 9 and stator cover 10 are made in the shape of pole crowns, out of which pole arms 14, 15 extend. The pole arms are bent inward at a 90° angle. In this instance, such pole arms of the stator would all have a rectangular cross-section. For the sake of clarity, only the two pole arms 14 and 15 of stator 9;10 lying in the cross-sectional plane, are represented in FIG. 3.

Figure 4:
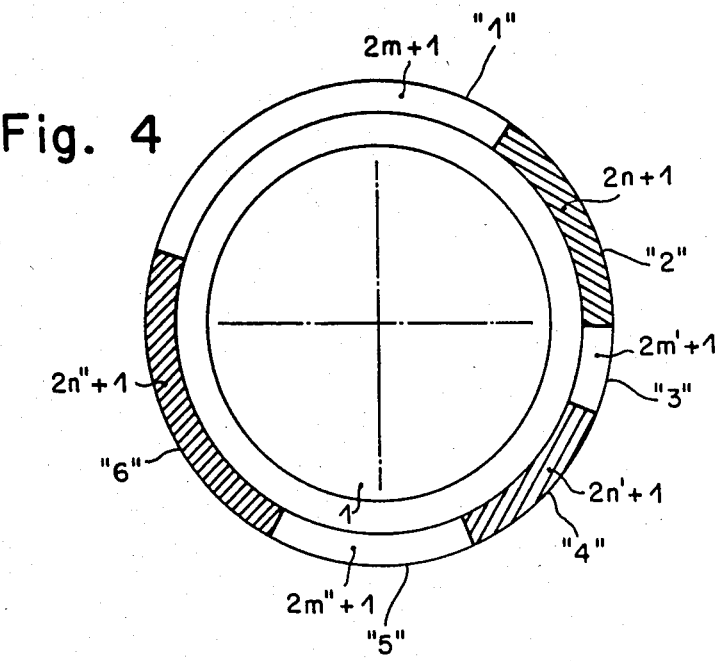
FIG. 4 is a basic drawing of the pole group sequence of the single-phase stepping motor of the invention.

FIG. 4 illustrates the arrangement of stator poles in the stepping motor of the present invention. The stator of FIG. 4 surrounding the exciter spool 8 and rotor 1 has pole arms arranged in pole groups along the periphery of the rotor, whereby they extend in the direction of the axis 11 (see FIG. 3) from one or the other side of stator 9;10 (see FIG. 3), into the space between the exciter spool 8 and the rotor 1.

In FIG. 4 it is assumed that there are six pole groups, numbered continuously from "1" to "6" in a clockwise direction. There are two types of pole groups. Each group of the one type, for example each odd-numbered group, i.e. groups "1", "3" and "5" of FIG. 4, has an uneven number $2m+1$, $2m'+1$, $2m''+1$, ... of exclusively north or exclusively south pole arms, and this is represented schematically in FIG. 4 by showing FIG. 4 by showing the surfaces belonging to these groups in white. Each of the other groups, i.e. the even-numbered groups "2", "4" and "6" of FIG. 4 comprises poles of North and South polarity. Each of the groups "2", "4" and "6" has an uneven number $2n+1$, $2n'+1$, $2n''+1$, ... of pole arms, and for this reason the surfaces belonging to this group are shown shaded in FIG. 4. m, m', m'', ..., n, n', n'', ... are always integer values, greater than zero.

Figure 5:
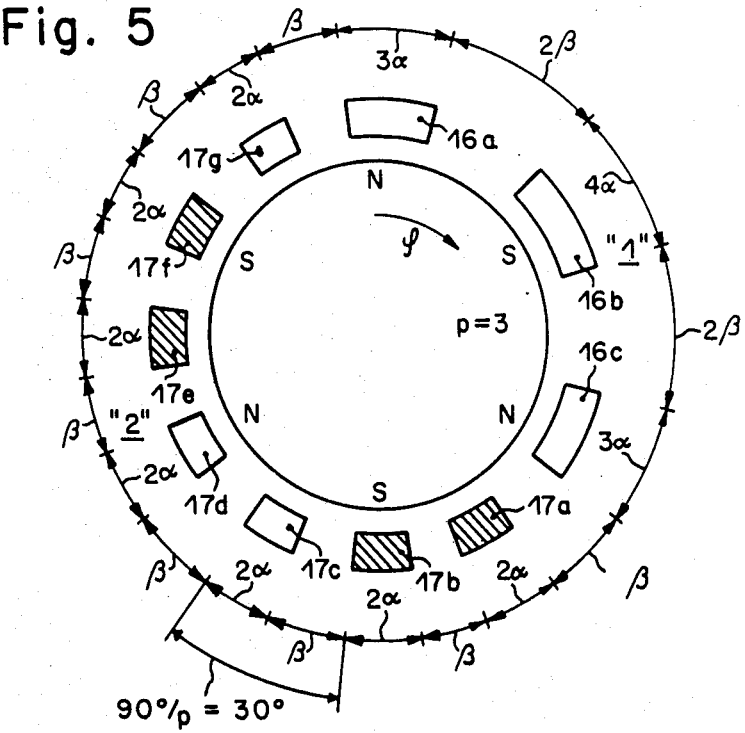
FIG. 5 is a basic drawing of the polar sequence of the single-phase stepping motor of the invention, having a rotor with three pairs of poles.

For the sake of simplification, it is assumed in FIG. 5 that only two groups, "1" and "2" are present, with group "1", for example, comprising three pole arms 16a, 16b and 16c, and group "2", for example, comprising seven pole arms 17a, 17b, 17c, 17d, 17e, 17f and 17g.

The single-phase stepping motor represented in FIG. 5 rotates for example, in a clockwise direction, and its angle of rotation is designated by $\phi$. Its rotor 1 has $2p=6$ poles of alternating polarity N and S, so that $p=3$. The cross sections of the pole arms of the stator 9;10 are shown either white or shaded, and this corresponds in each case to a particular polarity.

All pole arms 16a, 16b and 16c of group "1" have a white cross section in FIG. 5, and thus are, as already mentioned, of same polarity.

The angular distance between neighboring pole arms 16a, 16b and 16c of groups "1", "3" and "5" with pole arms of identical types (e.g. group "1" in FIG. 5) is in each instance equal to $2\beta$. Every other angular distance between neighboring pole arms of the stator is equal to $\beta$. E.g.: not only within the other groups "2", "4" and "6", and therefore within group "2" in FIG. 5, is the angular distance between their pole arms 17a, 17b, 17c, 17d, 17e, 17f and 17g equal to $\beta$, but also between neighboring end poles, for instance between 16c and 17a, of two neighboring groups.

The pole arms of even-numbered groups, e.g. of group "2" in FIG. 5, are arranged in pairs, wherein successive pairs have opposite polarities. The last pole arm in the direction of rotation of the stepping motor is unpaired, as an uneven number of pole arms are present per group. The pole arms in each even-numbered group of FIG. 5, i.e. pole arms 17a, 17b, 17c, 17d, 17e, 17f and 17g of group "2", each have an angular width $2\alpha$. The two outer pole arms of the odd numbered groups "1", "3" and "5", i.e. for example pole arms 16a and 16c of group "1", have an angular width of approximtely $3\alpha$ and the inner pole arms of these groups "1", "3" and "5", such as for example pole arm 16b, have an angular width of nearly $4\alpha$.

In the even numbered groups, each first pair of pole arms in the rotating direction of the stepping motor, e.g., pole arms 17a and 17b of Group "2" in the case of FIG. 5, are of a different polarity than that of the pole arms of the odd-numbered groups, i.e., pole arms 16a, 16b and 16c of group "1". Accordingly, the cross-section of pole arms 17a and 17b in FIG. 5 are shaded. Since the pole arms of the even numbered groups are arranged by pairs, with alternating polarity, pole arms 17a, 17b, 17e and 17f are of the same polarity and are represented by shaded cross-section. The pole arm which is missing a partner of the same polarity in FIG. 5 is pole arm 17g. The sum $2\alpha + \beta$ must be approximately equal to 90°/p, i.e., it must be nearly equal to 30° with p=3.

Within the segments of the odd-numbered groups, e.g., in the segment of Group "1" in FIG. 5, the switching moments (i.e. torques) $M_{S+}$ and $M_{S-}$ are both zero. Thus, only the rest moment produced by the permanently magnetized rotor 1 is present in this segment. The magnetic flux produced by the rotor magnets is thus not coupled with any of the flux produced by exciter spool 8.

Within the segment of the even-numbered groups, e.g., within the segment of group "2" in FIG. 5, on the other hand, the rest moment is equal to zero. Rotor 1 represents only a purely magnetic resistance in this segment, and this resistance changes as a function of the angle of rotation $\phi$.

In a preferred design, at least all the groups of the same type have an equal number of pole arms, i.e.:

$m = m' = m''$ and/or $n = n' = n''$.

In a further prefered design, only two groups exist.

A recess 18 is provided in the zone of stator cover 10 (FIG. 3) facing the pole arms of the odd-numbered groups (14 in FIG. 3). This ensures that the magnetic flux produced by the exciter current remains low in these pole arms.

To counteract any rotor vibrations, a loop spring 19 in the shape of a screw is provided. One end of the spring loops around bearing 13, and the other end loops around a cylindrical rim 20 of rotor 1. The loop spring 19 does not inhibit rotor 1 when rotor 1 rotates forward, but dampens any return swing.

The pole arms 16a, 16b, 16c, 17a, 17b, 17c, 17d, 17e, 17f and 17g of the stator, shown in FIG. 5, may all have a circular cross-section instead of a rectangular cross-section. Pole arms with a circular cross-section require one additional manufacturing step, as compared to pole arms with a rectangular cross-section. It is therefore advantageous to use the latter, whereby all rectangular cross-sections are arranged tangentially to a common circle which is concentric with rotor 1. Each rectangular cross-section is perpendicular to that radius of the circle which coincides with its median line, with the exception of the rectangular cross-sections of the two outside pole arms, for example 16a and 16c, of groups "1", "3" and "5" with pole arms of same polarity, which are each arranged perpendicularly to that radius of the circle which divides their cross-section in the proportion of 1:2, where the smaller of the thus obtained two cross-sections is always situated on the outside, adjacent to a neighboring group.

The above described embodiments of the invention are intended to be illustrative only. Numerous alternative embodiments may be devised by those skilled in the art without departing from the spirit and scope of the following claims.

I claim:

1. A single-phase stepping motor, comprising:
    a permanently magnetized rotor, having an axis, and having at least one pair of magnetic poles of alternating polarity evenly distributed around the circumference of said rotor;
    a substantially ring-shaped exciter coil, concentric with, and surrounding said rotor so as to form a concentric space between said exciter coil and said rotor;
    a stator of magnetic material, surrounding said exciter coil and said rotor, and having a first side and a second side;
    a first plurality of stator pole arms extending from said first side of said stator into said concentric space between said rotor and said exciter spool, said first plurality of stator pole arms being arranged in at least one first type of group having an odd number of stator pole arms of identical polarity such that said stator pole arms at each extremity of said first type of group each subtend an angle of approximately $3\alpha$ about said axis, and each inner stator pole arm of said first type of group subtends an angle of approximately $4\alpha$ about said axis, such that the angle subtended about said axis between adjacent said stator pole arms of said first type of group is $2\beta$;
    a second plurality of stator pole arms extending from said first side and said second side of said stator in an axial direction into said concentric space between said rotor and said exciter spool, said second plurality of stator pole arms being arranged in at least one second type of group having an odd number of stator pole arms sequentially arranged in pairs of alternating plurality with the addition of one unpaired stator pole arm such that each said stator pole arm of said second type of group subtends an angle of $2\alpha$ about said axis and such that the angle subtended about said axis between each said stator pole arm and its neighboring stator pole arm is $\beta$, said second type group alternating with said first type of group around said rotor in such a manner that said unpaired stator pole arm of said second type of group is of the same polarity as said stator pole arms of said first type of group;
    the relationship between $\alpha$ and $\beta$ being such that twice $\alpha$ plus $\beta$ is equal to 90° divided by the number of pairs of said rotor poles;
    whereby the direction of rotation of said rotor is from said unpaired stator pole arm of said second type of group to said neighboring stator pole arm of said first type of group.

2. Single-phase stepping motor as in claim 1, whereby at least all said groups of the same type have an equal number of stator pole arms.

3. Single-phase stepping motor as in claim 1, whereby only two groups are present, one group of said first type and one group of said second type.

4. Single-phase stepping motor as in claim 1, whereby all said stator pole arms have rectangular cross sections in a plane perpendicular to said axis, and are all arranged tangentially to a common circle which is concentric with said rotor, whereby each cross-section is perpendicular to that radius of said common circle which coincides with its median line, with the exception of the cross sections of the two outer stator pole arms in said groups of said first type which are each arranged perpendicularly to that radius of said common circle which divides their cross-sections into two parts, in a proportion of one to two, with the smaller of the thus obtained parts always being adjacent to a neighboring group.

* * * * *